(12) United States Patent
Bertin et al.

(10) Patent No.: US 6,345,362 B1
(45) Date of Patent: Feb. 5, 2002

(54) MANAGING $V_T$ FOR REDUCED POWER USING A STATUS TABLE

(75) Inventors: Claude Louis Bertin, South Burlington; Alvar Antonio Dean; Kenneth Joseph Goodnow, both of Essex Junction; Scott Whitney Gould, South Burlington; Wilbur David Pricer, Charlotte; William Robert Tonti, Essex Junction; Sebastian Theodore Ventrone, South Burlington, all of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/287,173

(22) Filed: Apr. 6, 1999

(51) Int. Cl.$^7$ ................................................. G06F 1/32
(52) U.S. Cl. ..................... 713/300; 713/320; 713/322; 713/323; 713/324
(58) Field of Search ......................... 713/300, 322–324, 713/320, 330, 340, 600, 601

(56) References Cited

U.S. PATENT DOCUMENTS

| | | | |
|---|---|---|---|
| 5,142,684 A | 8/1992 | Perry et al. .................. 395/750 |
| 5,167,024 A | 11/1992 | Smith et al. ................. 395/375 |
| 5,452,401 A | 9/1995 | Lin ............................. 395/750 |
| 5,461,266 A | 10/1995 | Koreeda et al. ............. 307/125 |
| 5,485,623 A | 1/1996 | Kurokawa et al. ........ 395/182.2 |
| 5,589,783 A | 12/1996 | McClure ..................... 326/71 |
| 5,610,533 A | 3/1997 | Arimoto et al. ............... 326/33 |
| 5,627,412 A | 5/1997 | Beard .......................... 307/82 |
| 5,655,124 A | 8/1997 | Lin ........................ 395/750.04 |
| 5,675,808 A | 10/1997 | Gulick et al. ................ 395/750 |
| 5,692,201 A | 11/1997 | Yato ............................ 395/750 |
| 5,692,204 A | 11/1997 | Rawson et al. ............. 395/750 |
| 5,719,800 A * | 2/1998 | Mittal et al. ................ 713/321 |
| 5,754,869 A | 5/1998 | Holzhammer et al. . 395/750.01 |
| 5,790,875 A | 8/1998 | Andersin et al. ...... 395/750.03 |
| 5,815,724 A * | 9/1998 | Mates .......................... 713/322 |
| 5,825,674 A * | 10/1998 | Jackson ....................... 713/321 |
| 5,881,290 A * | 3/1999 | Ansari et al. ................ 395/705 |
| 5,996,083 A * | 11/1999 | Gupta et al. ................. 713/322 |
| 6,219,796 B1 * | 4/2001 | Bartley ........................ 713/320 |

\* cited by examiner

*Primary Examiner*—Xuan M. Thai
(74) *Attorney, Agent, or Firm*—Connolly Bove Lodge & Hutz LLP; Eugene I. Shkurko

(57) ABSTRACT

An integrated circuit includes a CPU, a power management unit and plural functional units each dedicated to executing different functions. The power management unit controls the threshold voltage of the different functional units to optimize power/performance operation of the circuit and intelligent power management control responds to the instruction stream and decodes each instruction in turn. This information identifies which of the functional units are required for the particular instruction and by comparing that information to power status, the intelligent power control determines whether the functional units required to execute the command are at the optimum power level. If they are, the command is allowed to proceed, otherwise the intelligent power control either stalls the instruction sequence or modifies process speed.

19 Claims, 8 Drawing Sheets

MANAGING $V_T$ FOR REDUCED POWER USING A STATUS TABLE

RELATED APPLICATION

This application is related to co-pending application Ser. No. 09/287,159, filed on even date herewith entitled MANAGING $V_t$ FOR REDUCED POWER USING POWER SETTING COMMANDS IN THE INSTRUCTION STREAM filed in the names of Alvar Dean, Sebastian T. Ventrone and Patrick E. Perry.

TECHNICAL FIELD

The invention relates to integrated circuits and more particularly intelligent power management of the integrated circuit.

BACKGROUND OF INVENTION

The application and acceptance of portable electronic devices has emphasized the importance of controlling and or optimizing power consumption. Actually controlling power consumption may be satisfied by adjusting the body voltage (i.e. the voltage magnitude between body and source) applied to transistors in an integrated circuit (IC). By increasing the body to source voltage, transistors achieve a higher threshold voltage, consume less static power but on the other hand provide lower performance. Conversely, lowering the body to source bias voltage reduces the transistor threshold voltages, providing higher performance but consuming greater static power. It is also known that the IC can be broken down into several partitions or sectors and the body voltage controlled on a partition by partition basis, see in this regard copending application entitled "Low Powering Apparatus for Automatic Reduction of Power in Active and Standby Modes" by Dean et al filed Jul. 21, 1998, Ser. No. 09/120,211, "Device and Method to Reduce Power Consumption in Integrated Semiconductor Devices Using a Lower Power Groggy Mode", Bertin et al, filed on Sep. 24, 1998, Ser. No. 09/159,861 and "ASIC Low Power Activity Detector to Change Threshold Voltage", Dean et al, U.S. Ser. No. 09/159,898, filed on Sep. 24, 1998. The disclosures of these applications are incorporated herein by reference.

In the foregoing technology, the threshold voltage variation is implemented in integrated circuits involving Silicon-on-insulator (SOI) circuits. SOI circuits are circuits in which each element can be, or is, insulated from adjacent elements. However, as taught in co-pending application Ser. No. 08/866,674, Kalter et al, filed May 30, 1997 (the disclosure of which is incorporated herein by this reference), isolation from adjacent elements can also be obtained in so-called bulk silicon integrated circuits. Consequently, the integrated circuits described herein need not be limited to SOI integrated circuits. Rather, as described in the cited co-pending application, integrated circuits exhibiting the invention may also be implemented in bulk silicon.

Notwithstanding the foregoing, the art lacks a technology to allow optimizing power management in light of the actual repertoire of instructions applied to a partitioned integrated circuit.

SUMMARY OF INVENTION

The present invention provides an integrated circuit in which power is managed intelligently relative to the demands placed on the integrated circuit. In order to implement the foregoing the integrated circuit is designed with discrete functional units, each dedicated to a particular function or functions where each of the functional units has an independently controllable body voltage or threshold voltage ($V_t$). Consequently, each of the functional units can be operated at one of plural power levels depending on the body or threshold voltage applied thereto and independent of other functional units. Since the functional units have discrete functions, it is possible to correlate specific software instructions with one, or a set of, functional unit(s). Execution of the instruction at a high rate will require the correlated functional unit(s) to be in a high power state, other functional units need not be in a high power state.

For example, assume an IC embodying the invention had functional units dedicated to floating point arithmetic functions and a modem and the application program or program segment being executed involved a remote file transfer but no floating point operations. One could optimize the performance and power consumption of the IC for this program or program segment by reducing the power consumed by the floating point arithmetic functional unit to a minimum and raising the power consumption of the modem-related unit(s). Raising of the power level in the modem-related unit(s) is justified by the increase in performance while the power savings on the floating point arithmetic functional unit is obtained at no cost since the absence of floating point arithmetic operations means the performance of that functional unit or units is of no consequence to the execution of the application or program segment.

In general it is an object of the invention to control the power consumption of various functional units so as to present functional units in a high power state when instructions requiring their operation are to be executed and concomitantly to insure power is not wasted on functional units which are not involved in current instructions. The invention can be applied in various ways. For example, on power up all functional units may be powered to a high power state and units may be selectively depowered or run at reduced power to the extent current, or about to be executed, instructions do not require the function. Alternatively, units may be powered up or run at increased power levels when an instruction is identified which is about to be executed and requires the function. The power down of a functional unit which is operating at a high power state can depend on upcoming instructions, a time delay, or both.

In addition to the current or next instruction, the apparatus and method of the invention preferably should account for the delay occasioned in a transition of the power status of a functional unit from one power level to another. Thus, for example, in some cases it will be more efficient to maintain a high power status of a particular functional unit if the expected or nominal time gap between two instructions which require that functional unit is small relative to the delay in a power level transition.

The integrated circuit also includes a central processor which is coupled to the functional units to coordinate instruction execution. The central processor includes an intelligent power control which has at least a decode unit, a status table and a execution unit. In particular, the decode unit is responsive to the instruction stream. The decode unit maintains a correlation of instructions vs functional units. Having decoded an instruction, the decode unit can then identify a required one or ones of the functional units for executing that particular instruction. The status table indicates power status or power level data (which may be in the form of body voltage) for the functional units. Logically combining the output of the decode unit and the status table will indicate which, if any, of the functional units required for execution of a particular instruction are not at a high power state. This information is used in determining whether high speed operation for that instruction can be enabled.

An execution unit serves to allow execution of the instruction at the current processor speed if the information shows that power level status of the required functional units meets the requirement of the impending instruction(s).

In the event that one or more of the functional units do not have the required power status for execution at current processor speed, then the execution unit comes into play.

A first option for the execution unit is to stall (or delay) the instruction stream for a time sufficient for a change in the $V_t$ level of the particular functional unit so that, after the delay, the particular functional unit will have the appropriate $V_t$ for execution of the instruction.

The alternative to stalling the instruction stream is to maintain the instruction stream but to slow the process clock.

In some embodiments of the invention the functional units may have only two potential $V_t$ levels; in other embodiments one or more of the functional units may have more than two potential $V_t$ levels.

It should be understood that while different functional units have been described, one functional unit need not be totally independent of another and in some cases two different functional units may each include some common circuitry.

Preferably on chip reset, the functional units will default to the lowest power setting, represented by a high $V_t$.

Preferably when the power level for a given functional unit is increased, a timer or a timer function is initiated. The timer function is arranged to command return of a functional unit to lower power level on expiration. The timer function will expire on expiration of the timing period unless, within the timing period another request for a high power state of the functional unit is received which has the effect of reinitiating the timer function.

While the time period in some embodiments of the invention is fixed, in other embodiments of the invention the time period, before automatic reduction in functional unit power, is a programmable parameter.

In the event the stall option (to accommodate the delay occasioned by raising the power level of a functional unit) is undesirable, the instruction decode can be advanced in time relative to instruction execution, such as by a pre-fetch operation.

Thus in accordance with one embodiment the invention provides an integrated circuit chip including:

plural functional units subject to different power levels, only one of the power levels maximizing performance of the functional unit;

a central processor coupled to the functional units and operating at a current processor speed, the central processor including:

a decode unit for receiving and decoding an instruction and for identifying required ones of the functional units for executing the instruction;

a status table coupled to the functional units for indicating power level data of the functional units, a logic unit responsive to the decode unit and to the status table to determine if a functional unit required for execution of an instruction is not at the one power level; and an execution unit coupled to the logic unit for enabling execution of the instruction at the current processor speed if the power level data indicates that the required functional units have sufficient power levels.

BRIEF DESCRIPTION OF THE DRAWING

The present invention will now be described in further detail in connection with the attached drawings in which like reference characters identify identical apparatus and in which.

BEST AND VARIOUS MODES FOR CARRYING OUT INVENTION

Figure 1A:
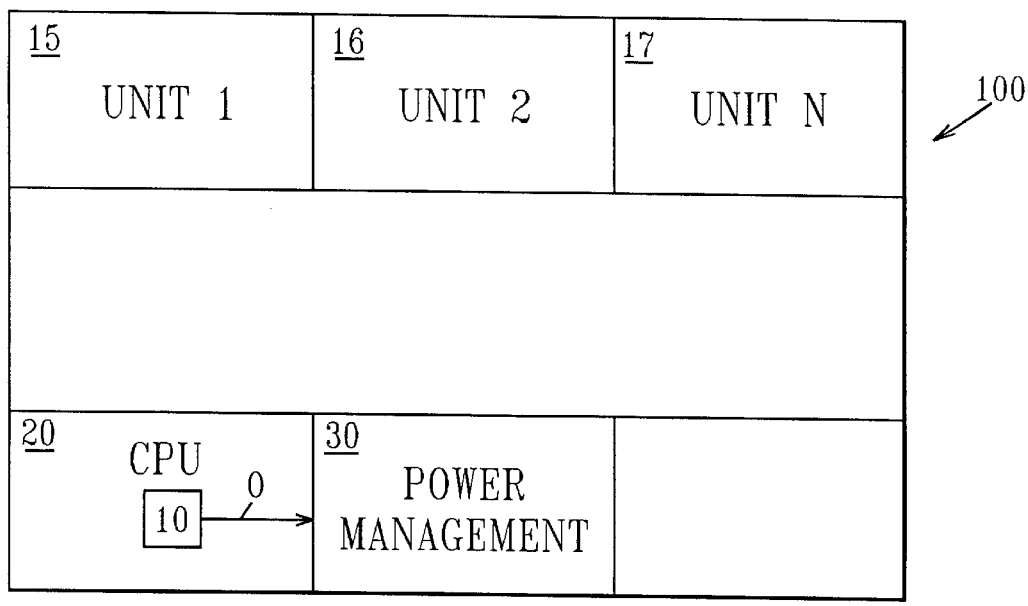
FIG. 1A is a block diagram of a typical integrated circuit chip which includes several functional units and a central processing unit including the intelligent power management apparatus of FIG. 1B.

FIG. 1A is an illustration of a typical integrated circuit chip 100 which incorporates the present invention. The chip 100 includes a plurality of functional units such as units 15, 16 and 17. Units 1–n are representative of a plurality of functional units which are included on the integrated circuit 100. Typically the functional units perform different functions and are capable of operating at different threshold voltages ($V_t$) where a higher threshold voltage represents a lower power consumption but at a slower speed of operation and a lower threshold voltage represents a higher power consumption but higher operating speed. As will be described, through the use of the method and apparatus of the invention the power consumption of the different functional units may be controlled so as to optimize operation of the chip as a whole in light of the specific instruction(s) which is or are presented for execution. It is the thesis of the present invention that some functional units of the integrated circuit are not used in the execution of some instructions and hence minimizing the power level of the unused functional units will not affect performance for such an instruction. Consequently, optimized chip power/performance for that particular instruction will result by running those particular functional units at a lower or lowest available power level.

Likewise, when an instruction is detected which requires one or more functional units for execution, those functional units which are not at the high performance level must be identified. Generally, once a unit has been raised to a higher performance level, the unit will remain at the level for a selected period and then, in the absence of further instructions which require high performance from the unit, the performance level of the unit will be returned to a lower power state. The selected period may be a constant for the chip, it may be variable on an application by application basis or may be a programmable parameter which can be altered even within an application.

FIG. 1A also shows that the integrated circuit chip includes a CPU 20 and a power management unit 30. The power management unit 30 sets the power levels for the different units, such as units 1–n, and responds to commands communicated thereto from the CPU 20 over the signal line O.

The CPU 20, and more particularly the intelligent power control 10, monitors the instruction stream for an indication of just what functions need be performed (just what instructions are to be executed) and creates commands to adjust power consumption of the various functional units to optimize operations without excessive or unnecessary power consumption. The chip 100 also includes a clock (not shown) which dictates the speed of operation of all elements on the chip. The intelligent power management control 10 is shown in more detail in FIG. 1B.

Figure 1B:
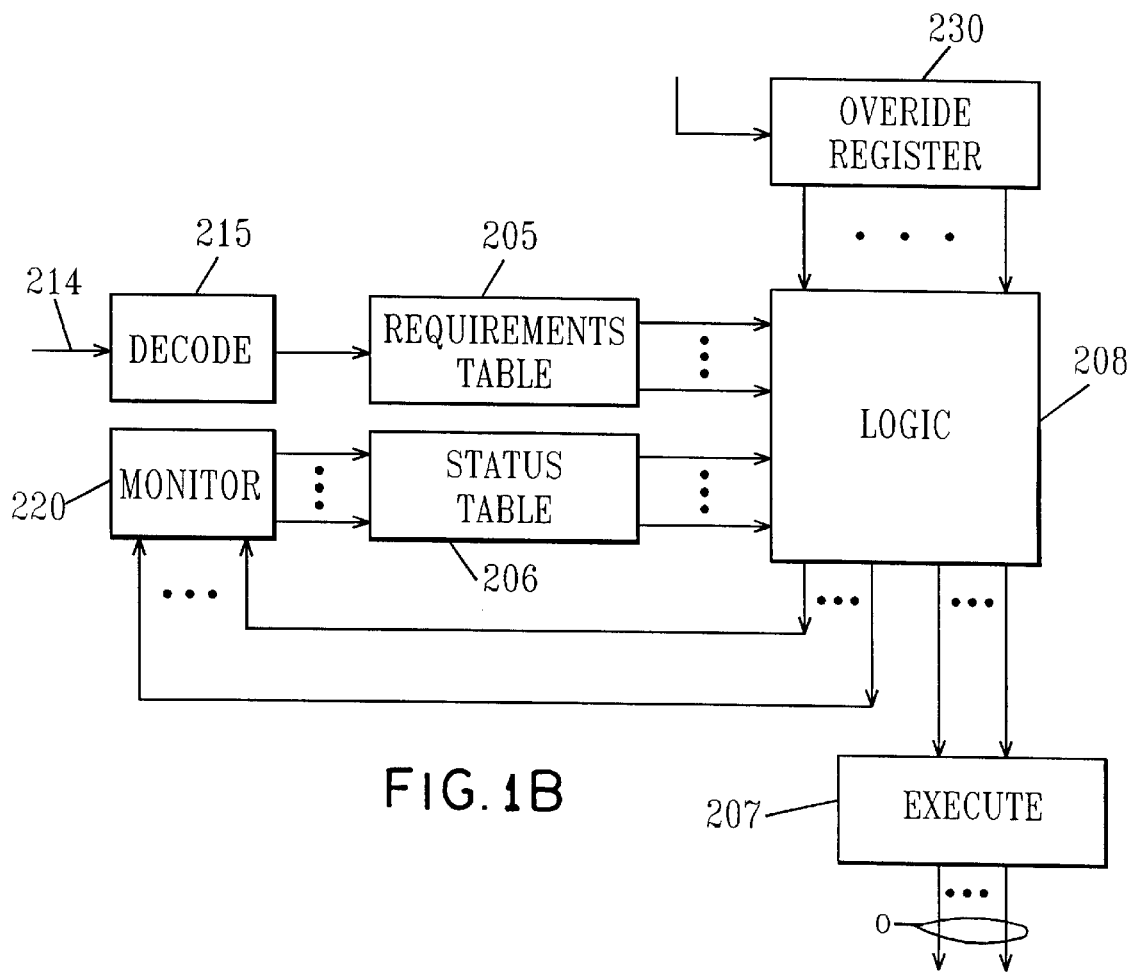
FIG. 1B is a block diagram of the intelligent power management system portion of the central processing unit in accordance with the invention.

As shown in FIG. 1B control 10 includes two tables, a requirements table 205 and a status table 206. Basically the requirements table 205 identifies, for each instruction that the chip 100 is capable of executing, which functional units on the chip are required to execute that instruction. The status table 206 reflects the present power status of each of the functional units on the chip. In a manner which will be described there is an output terminal in both the requirements table 205 and the status table 206 representing each of the different functional units. Corresponding outputs of the requirements table 205 and status table 206 are combined in logic 208. Logic 208 determines, for each functional unit whether the power requirement and power status for the unit are in agreement. Logic 208 also responds to an input from override register 230. The override register has storage dedicated to each of the functional units. The stored information indicates whether the associated functional unit should be maintained in a higher power state regardless of the other signals input to the logic 208. The contents of the override register 230 can be fixed or programmable. In the latter event the register may be written to by the user or the application. Signals are developed by the logic 208 to control the status of the associated functional unit to bring the requirements and status into agreement if necessary. In the event that a power transition is necessary, the execution unit 207 can either reduce the process clock or transition the performance level of that particular functional unit.

Referring to FIG. 1B, the decode unit 215 has, as an input, a stream of instructions from memory. Clearly the time required for the processing of FIG. 1B will dictate how far in advance of execution the instructions should be presented to the decode unit 215. The decode unit 215 decodes each input instruction and addresses the requirements table 205 to identify which, if any, of the functional units are required to execute that instruction.

Figure 2:
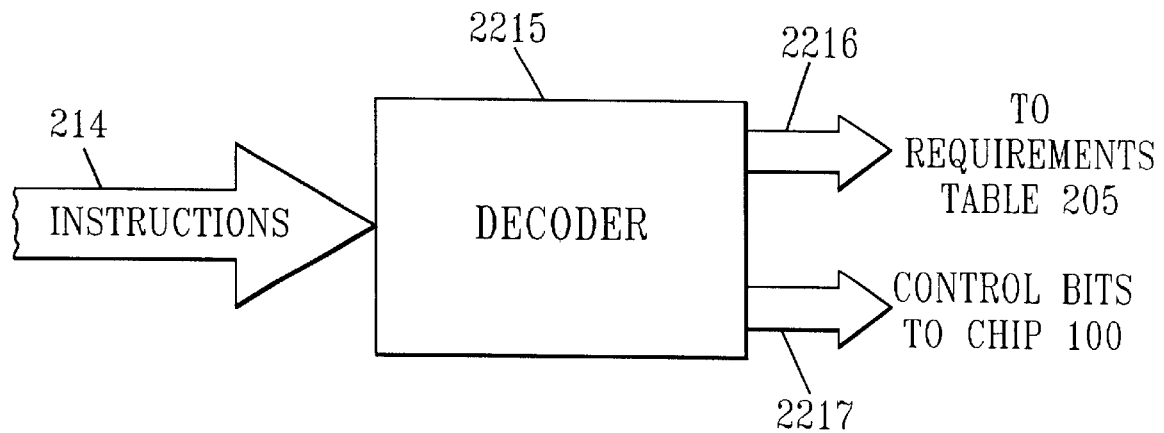
FIG. 2 is a block diagram of the decode unit 215 as seen in FIG. 1B.
Figure 3:
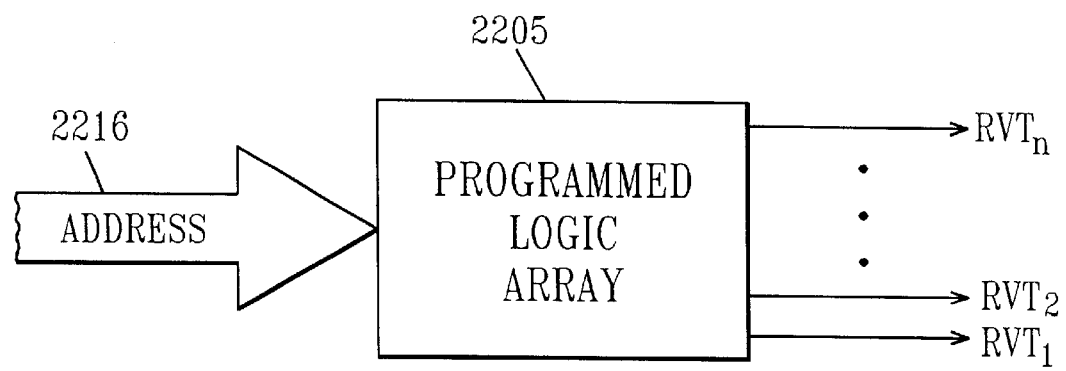
FIG. 3 is a block diagram of the requirements table 205 as seen in FIG. 1B.

FIG. 2 is a detail of the decode unit 215. The major element is decoder 2215 which may be implemented as read only memory (ROM), a programmed logic array (PLA) or random logic. Input to the decoder 2215 is the stream of instructions 214, each instruction comprising plural bits. However implemented, the output of the decoder 2215 is information formatted into two information groups. A first information group is one or more control bits 2217 which may be connected to selected locations on the chip 100. A second information group is the address 2216. The address 2216 comprises plural bits which are input to the requirements table 205 as seen in FIG. 1B and in more detail in FIG. 3. FIG. 3 shows the major element of the requirements table 205 as comprising programmed logic array 2205 with the address 2216 as an input. The output of the programmed logic array 2205 is a set of information bits $RVT_1$ through $RVT_n$, one bit per functional unit of the chip 100. A typical one of the information bits $RVT_1$ through $RVT_n$ is in one state when the corresponding functional unit is required to be in a high power state for execution of the instruction and the bit is in another state where high power operation of the functional unit is not required for execution of the instruction. In embodiments which admit of more than two power levels per unit, clearly more than a single bit is required for power status requirements. Those skilled in the art can readily adapt the illustrated structure to provide for more than one bit per unit as necessary.

The power status of each of the units, i.e. the $V_t$ level, is reflected in monitor 220. The monitor 220 provides this information to write the status table 206. As a consequence, the status table 206 reflects the current power ($V_t$) status of each of the functional units on the chip.

Figure 4A:
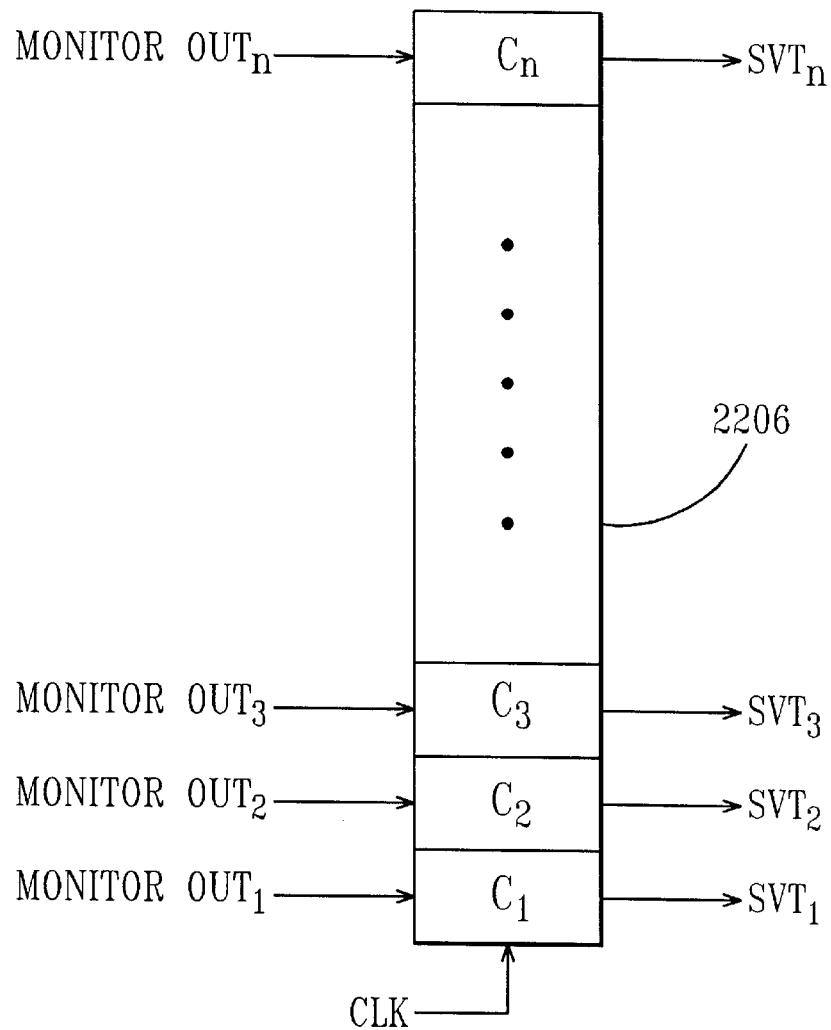
FIG. 4A is a block diagram of the status table 206 as seen in FIG. 1B.
Figure 4B:
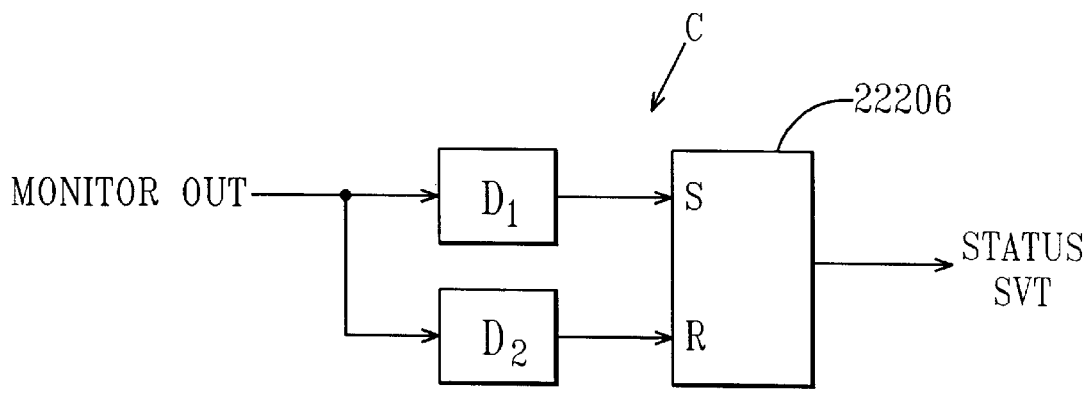
FIG. 4B is a block diagram of a typical status table cell C.

The status table can be described in connection with FIGS. 4A and 4B. FIG. 4A shows that the status table 2206 comprises a number of cells $C_1$ through $C_n$, one cell per functional unit. The input to each cell is a signal Monitor out and the output of each cell is a status signal SVT. FIG. 4B is a detail of a typical cell C. As seen in FIG. 4B, the major element of each cell is a bistable 22206 with set and reset terminals S and R respectively and a single output terminal. The cell input is connected to set and reset terminals S and R through delays $D_1$ and $D_2$ respectively. By selecting the relationship of the delays provided by $D_1$ and $D_2$ the inertia presented by the $V_t$ transition can be followed. Thus for the low to higher power transition, the delay $D_1$ must expire between the time that the related signal Monitor out is asserted and the time the set terminal of the bistable C is enabled. The same goes for the higher to lower power transition in relation to the Delay $D_2$.

Figure 5A:
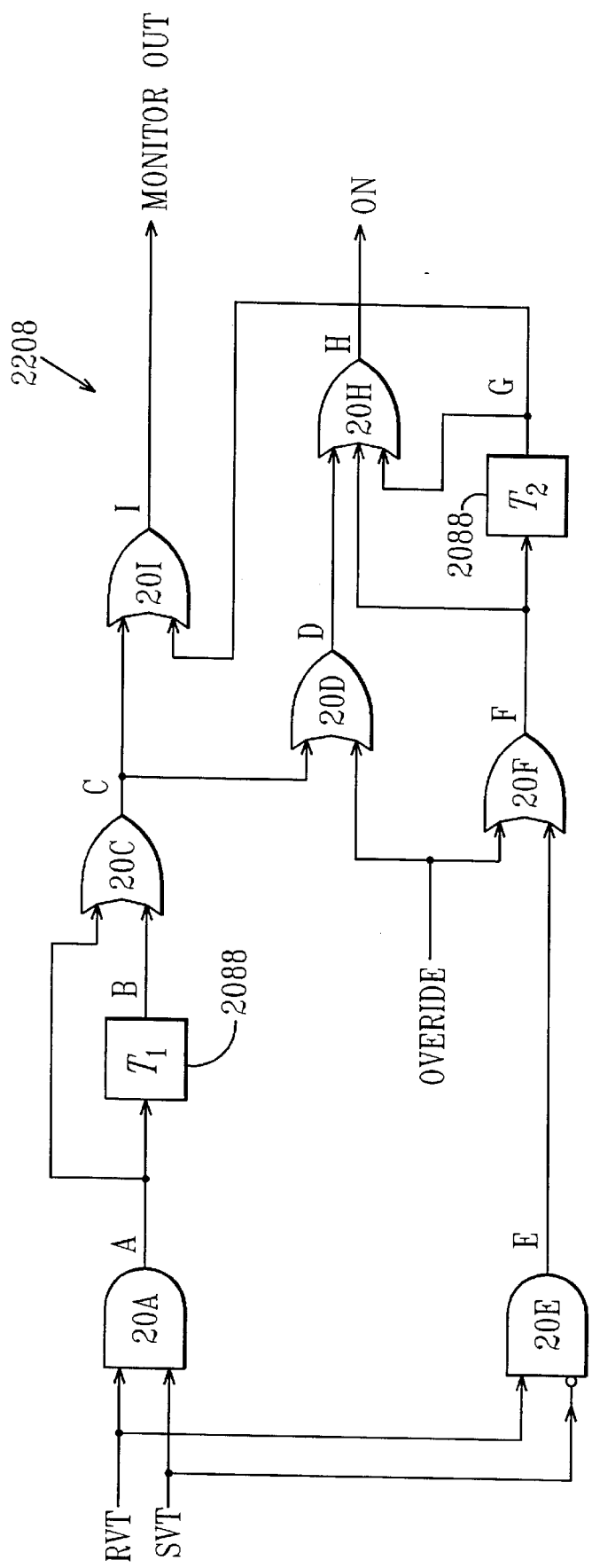
FIG. 5A is a block diagram of one component of the logic 208 as seen in FIG. 1B.
Figure 5C:
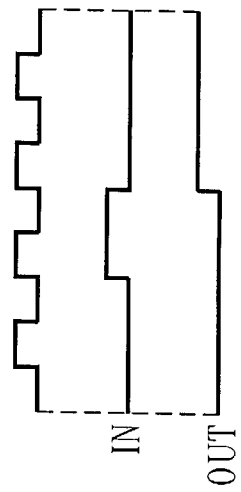
FIG. 5C illustrates three related timing diagrams useful in describing the operation of delay circuits 5088.
Figure 5B:
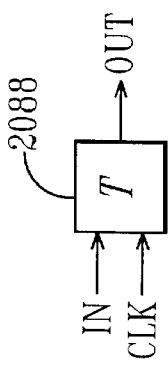
FIG. 5B is a detail of the delay circuit 5088 of FIG. 5A.

Logic 208 comprises a number of logic elements, one logic element per functional unit on the chip 100. A typical logic element 2208 is illustrated in FIG. 5A. The logic element 2208 has two inputs, RVT and SVT from the corresponding terminals of the requirements table 205 and the status table 206, respectively. In addition, an input to the logic element 2208 comes from the corresponding element of the override register 230. The logic element 2208 has two outputs, a Monitor out (which is connected to the input of the corresponding element of the status table 206) and an output ON which is input to the Power Management 30 (see FIG. 1A). When ON indicates the related unit should be in a higher power state, the Power Management 30 provides the proper control to effect that state. Likewise when the state of ON indicates that the related unit should be in a lower power state, the Power Management 30 provides the proper controls to effect that state. The inputs RVT and SVT are connected to input terminals of AND gate 20A and AND gate 20E, the latter has a negation element on the SVT input terminal. The output A of AND gate 20A is connected to input terminals of delay $T_1$ and OR gate 20C. The output terminal of delay $T_1$ is the other input to OR gate 20C. The output C of gate 20C is the input to OR gate 20D. An input to OR gates 20D and 20F is the corresponding element of the override register 230. The other input to OR gate 20F is the output E of the AND gate 20E. The output of OR gate 20F is the input to delay $T_2$ and an input to OR gate 20H. Another input to OR gate 20H is the output D of OR gate 20D and the output of delay $T_2$. The output H of gate 20 H is the signal ON. OR gate 20I has inputs from the output C of OR gate 20C and the output of delay $T_2$. The output I of gate 20I is the signal MONITOR OUT. FIGS. 5B and 5C are a detail of a typical delay T and corresponding wave form diagram, respectively.

Override register 230 has storage for each functional unit on the chip 100. In one embodiment register 230 stores a single bit per functional unit. The operation of that bit is described below. Override register 230 may be controlled by the application software to allow direct control of speed/power parameters of the chip 100. In other words, regardless of the operation of the intelligent control 10, the override register 230 may be programmed to dictate high power operation by directly controlling the logic 208.

Refer again to FIG. 5A. It should be apparent that the input to gate 20D from the override register 230 can force the output D to be high. This state of output D, in turn can force the output H of gate 20H to be high. Since this output, ON, is effective to raise the power level of the associated functional unit it should be clear that in the proper state the override register 230 can override any effect of the other signals to logic 208.

Figure 7A:
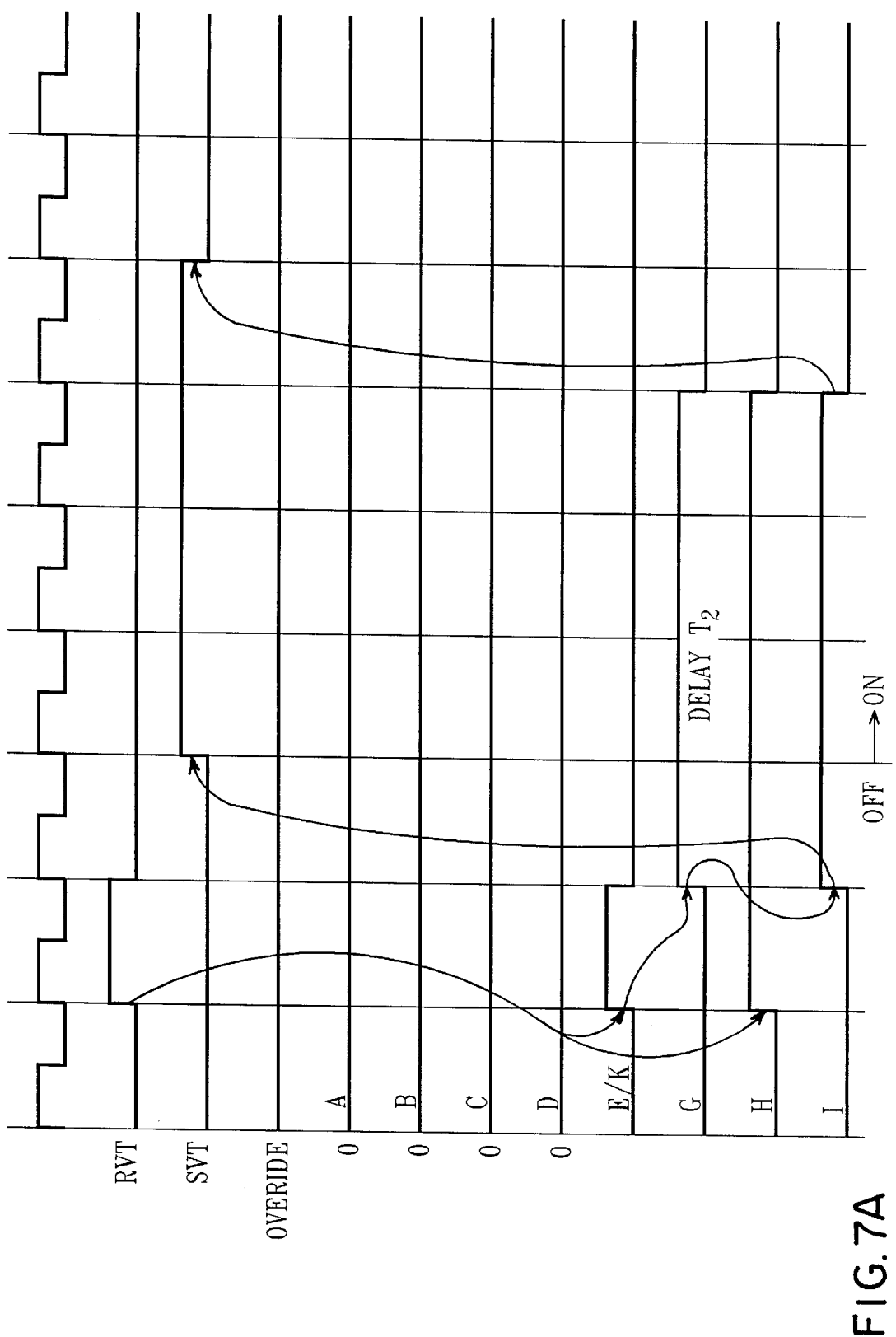
FIGS. 7A and 7B are waveforms useful in describing the operation of the logic 208.
Figure 7B:
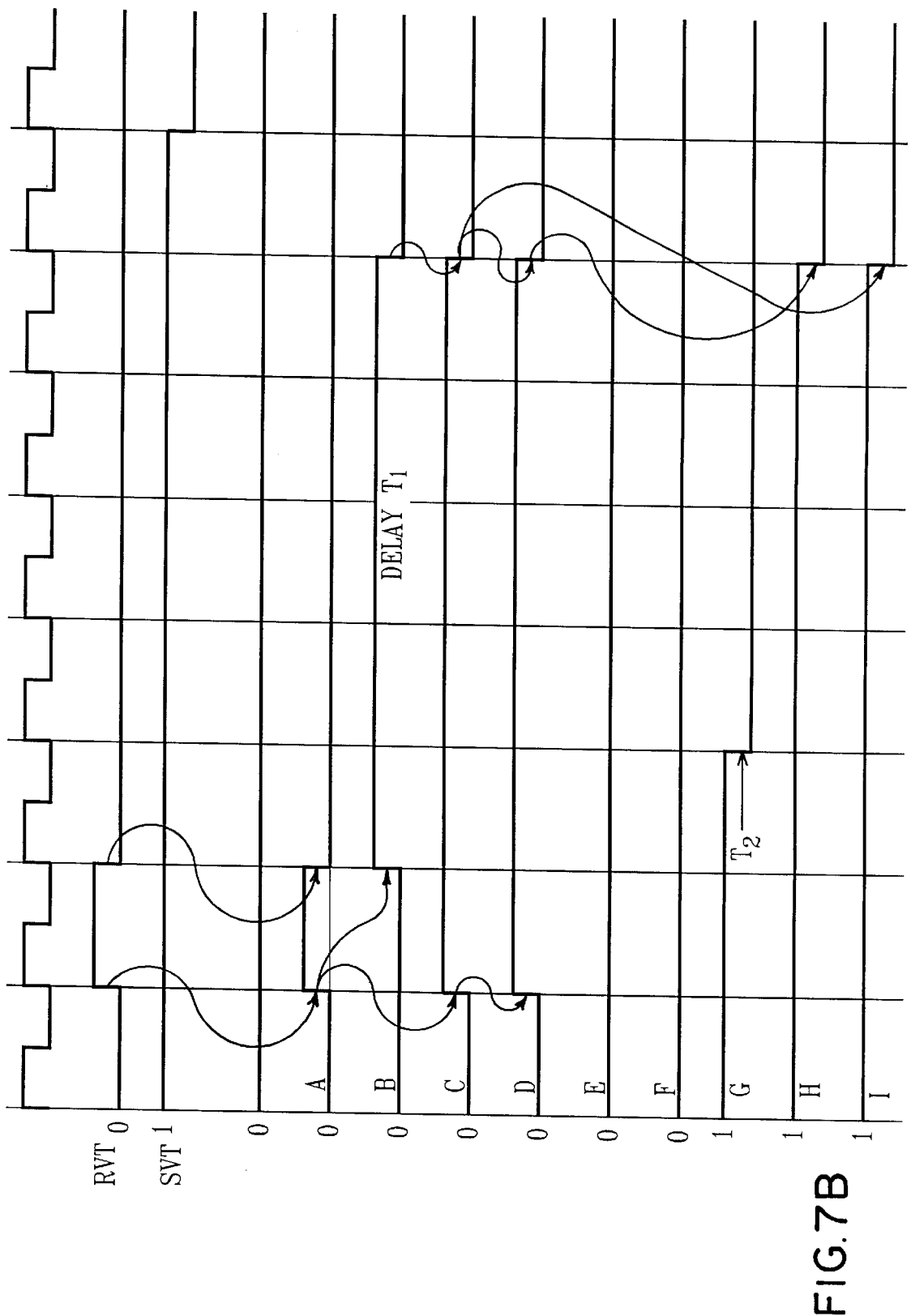

FIGS. 7A and 7B illustrate waveforms which are useful in explaining the operation of logic 2208. FIG. 7A is addressed to the situation in which a functional unit is in a lower power state and an instruction is decoded which indicates that that functional unit is required to be in a higher powered state. Because the functional unit is in a lower power state, the signal SVT is not asserted. Thus, FIG. 7A shows that when the low to high transition of RVT takes place, the signal SVT is in a low state. The high going RVT transition results in a high going transition in the signals E and F, respectively, that is the outputs of the gates 20E and 20F. The high going transition at 20F also results in a high going transition at the output of the gate 20H. This is the ON signal which is input to power management 30 to effect a low to high power transition in the functional unit. In addition, after a delay occasioned by $T_2$, there is a high going transition at the output of gate 20I. The output of gate 20I is Monitor out. Referring to FIG. 4A, it will be evident that after some further delay (occasioned by the delay $D_1$), the set terminal of bistable 22206 will be enabled and the signal SVT will go high, as is shown in FIG. 7A. Preferably delay D1 is programmed or selected to reflect the inertia (of time delay) in a unit making a transitino from a lower power to a higher power state. Likewise, D2 is preferably programmed or selected in relation to the time required for a unit to make a transitino from a higher to a lower power state.

While the asserted status of SVT might enable gate 20A, because SVT is not asserted until RVT has fallen, gate 20A is not enabled. The output of gate 20H remains high even though the output of gates 20F and 20D are low, until the delay $T_2$ expires. Delay $T_2$ is used to extend the number of cycles that a unit is maintained at a higher power state after it makes a transition from a lower power to a higher power state. The delay period is measured from the time the output of gate 20F is asserted. When that delay expires, the output of gates 20H and 20I fall. The falling state of the output of gate 20H is a signal to the power management 30 to reduce the power to the associated functional unit. The falling state of the output of gate 20I will eventually result in a fall of the signal SVT, but only after the delay interposed by the delay $D_2$ (see FIG. 4B).

FIG. 7B is drawn for the situation where a particular functional unit is in a higher power state (SVT is at a high power level) when an instruction is decoded which requires that particular functional unit to be in a higher power state. The latter situation is reflected by the low to high transition of RVT. The rising edge of RVT induces a rising edge from gate 20A (since SVT is already high). This has several effects; a rising edge is induced at 20C and 20D. In addition, after the delay $T_1$, there is a rising edge at that input to gate 20C. A falling edge occurs at the output of the delay 2088 ($T_2$).

This state of affairs is maintained until the delay $T_1$ expires. The rinsing edge of RVT was produced because an instruction has been decoded which requires a particular functional unit and, at the time the instruction was decoded the unit was already in a higher power state (SVT high). The result of this state of affairs is to maintain the status of the functional unit for at least the additional time period of the delay $T_1$ beyond the time after decoding of the instruction which initiated these events. Expiration of the time period of the delay produces a falling edge at the input to gate 20C. Since at this time the other input (20A) is also low, there is a falling edge at 20C and likewise a falling edge at 20D, 20H and 20I. The falling edge at 20H is the signal to the power management 30 to lower the power to the related functional unit. Somewhat later (as is explained above) the falling edge at 20I results in a falling edge at SVT. While the logic element 2208 (FIG. 5A) is shown as random logic and in particular the delays $T_1$ and $T_2$ are shown as discrete elements, these may be fixed delays or programmable delays and, as is apparent to those skilled in the art, the entire logic function could be implemented in software as well.

Figure 6A:
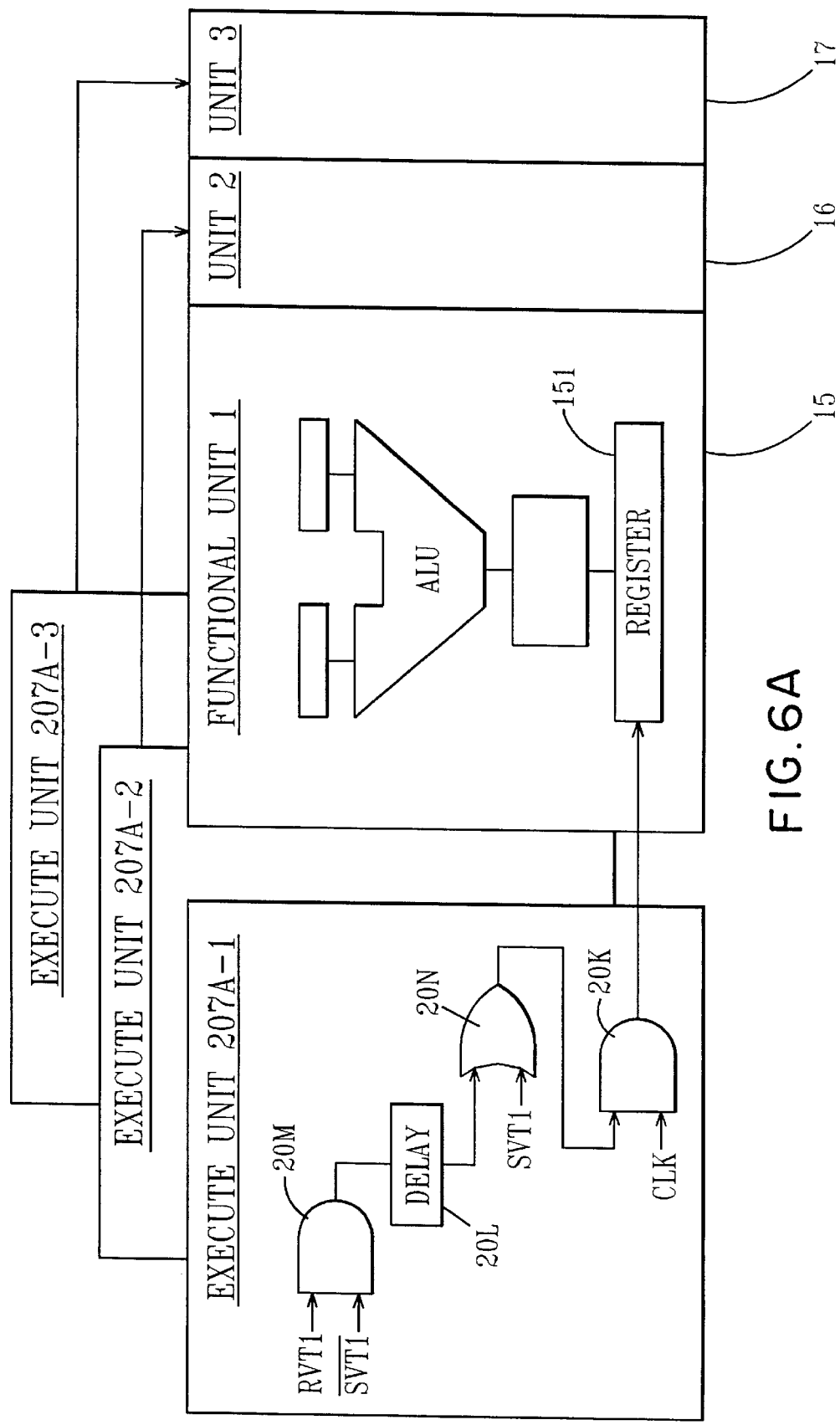
FIG. 6A shows one embodiment of the execute unit 207 as seen in FIG. 1B in relation to the chip partitions such as functional units 1 et seq. of FIG. 1A.
Figure 6B:
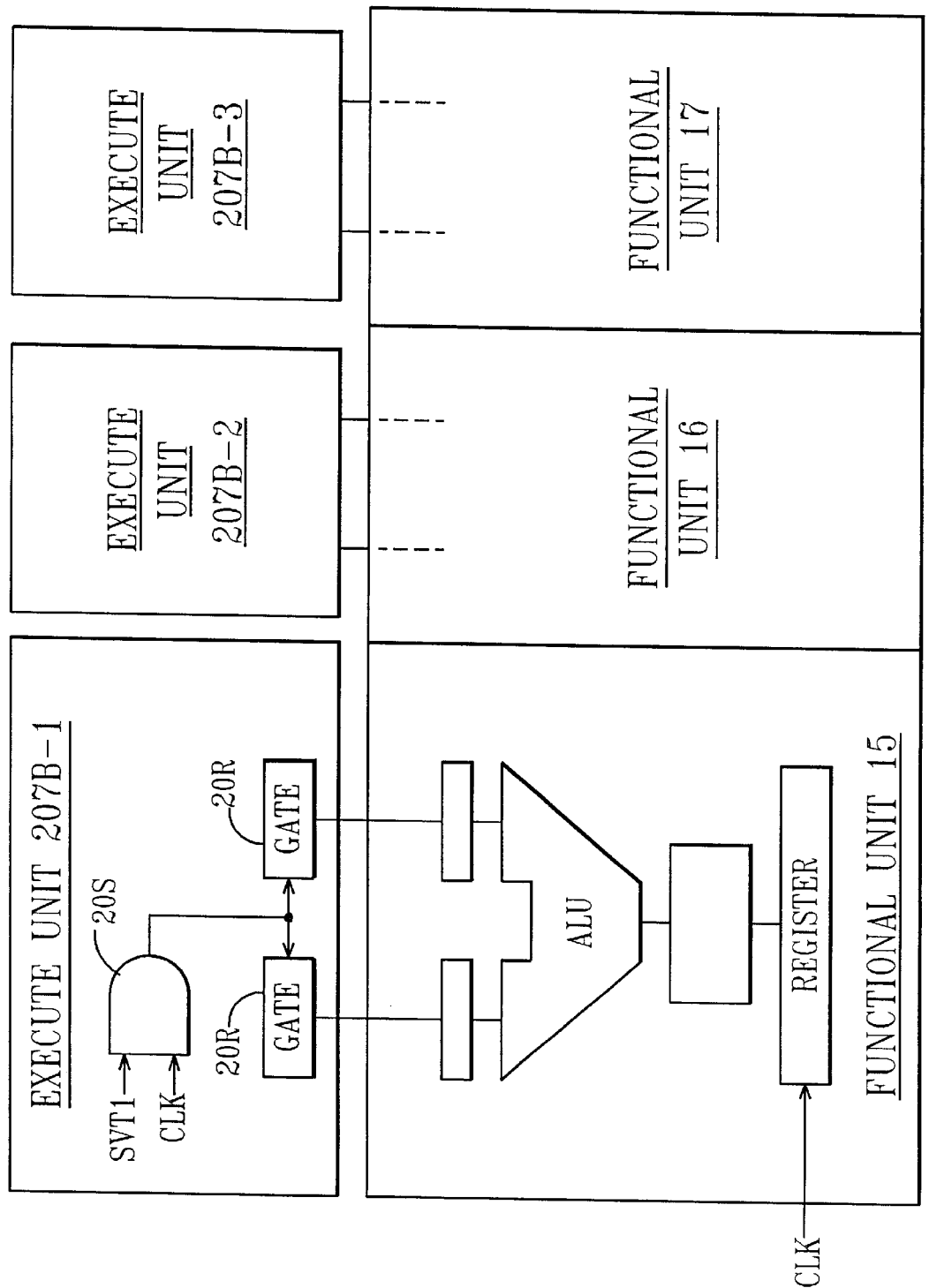
FIG. 6B shows another embodiment of the execute unit 207 as seen in FIG. 1B in relation to the chip partitions such as functional units 1 et seq. of FIG. 1A.

FIGS. 6A and 6B illustrate alternative embodiments for the execute circuit 207. The execute circuit takes the output of the logic 208 and uses that to enable the associated functional unit. The execute circuit 207 includes a number of elements, one for each functional unit. In the event that the instruction being executed requires high power operation of a particular functional unit and the particular functional unit happens to be in a high power state, then the execute unit merely allows normal operation. However, if the instruction requires operation of the associated functional unit and that unit is, at the time the instruction is to be executed, not in the appropriate high power state, then the execute unit must either:

1. Delay the onset of the operation of the functional unit to account for delay occasioned in the low power to high power transition, or
2. Slow completion of the process down so that the functional unit can complete the functioning at the speed associated with the lower power state.

FIG. 6A illustrates three typical functional units, unit 1, unit 2 and unit 3 and indicates that each is associated with a dedicated execute unit such as units 207A-1, 207A-2 and 207A-3, respectively. The operation of the execute unit in FIG. 6A delays the time at which the functional unit must complete its operation to account for the slower process time when the functional unit is not in its high power state. The execute unit includes an AND gate 20M, a delay 20L, an OR gate 20N and another AND gate 20K. The inputs to the AND gate 20M are the signals RVT1 and /SVT1. Thus, gate 20M is enabled if a particular functional unit is required for operation of a particular instruction but that unit is not in a higher powered state. The OR gate 20N has an input from the delay 20L and another input from the signal SVT1. The latter signal is high when the associated functional unit is in a high powered state. The output of the OR gate 20M is one input to the AND gate 20K and the other input is a clocking signal CLK. When a particular functional unit is required for implementation of an instruction and that unit is in a higher powered state (indicated by assertion of the associated ON signal) and the OR gate 20N will be enabled so that the AND gate 20K will pass clock pulses to the functional unit as shown in FIG. 6A to enable normal operation.

On the other hand, in the event that operation of unit 1 for example is required but it is not in an appropriate high powered state, then the ON1 signal will not be asserted but AND gate 20M will be enabled. This will assert an input to the delay 20L. After an appropriate time (such as the time required for the functional unit to complete its execution at the slower speed associated with a lower powered operation), the output of the delay 20L will be asserted, and output of the OR gate 20M will go high enabling clock pulses to the functional unit. Thus as indicated in FIG. 6A, the process clock to the functional unit has been delayed to account for its slower operation in the event the functional unit is not at the appropriate higher powered operating condition.

FIG. 6B, on the other hand, shows an alternative which stalls the operation to account for the transition from a low powered to a high powered state. FIG. 6B shows an alternate version of the execute unit 207B-1 to that shown in FIG. 6A. In the case of FIG. 6B, when the execute unit 207B-1 finds that the associated functional unit is required for the instruction but is not in the appropriate power state, the onset of functional unit operation is postponed. As seen in FIG. 6B, the inputs to the functional unit 15 are gated with the output of AND gate 20S in gates 20R. The inputs to gate 20S, SVT1 and CLK, insure that not until the functional unit has achieved the higher power state (as reflected in assertion of SVT1) will the functional unit be allowed to react to the input signals. The execute circuits 207B-2 et seq. are similar to the circuit 207B-1 which is illustrated in detail.

The specification describes only the preferred embodiments of the invention but it is to be understood that the invention is capable of use in various other combinations, modifications, and environments and is capable of changes or modifications. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein, rather the scope of the invention is to be determined by the claims attached hereto.

What is claimed is:

1. An integrated circuit comprising:
    plural functional units subject to different power levels, only one of the power levels maximizing performance of the functional unit;
    a central processor coupled to the functional units and operating at a current processor speed, the central processor including:
        a decode unit for receiving and decoding an instruction and for identifying required ones of the functional units for executing the instruction;
        a status table coupled to the functional units for indicating power level data of the functional units,
        a logic unit responsive to the decode unit and to the status table to determine if a functional unit required for execution of an instruction is not at the one power level; and
        an execution unit coupled to the logic unit for enabling execution of the instruction at the current processor speed if the power level data indicates that the required functional units have sufficient power levels.

2. The integrated circuit of claim 1, wherein the execution unit includes means for reducing the execution speed below the current processor speed if the power level data indicates that not all the required ones of the functional units have sufficient power levels.

3. The integrated circuit of claim 1, which includes means for selectively adjusting the power levels of the functional units.

4. The integrated circuit of claim 3, wherein the execution unit includes means for stalling execution of instructions to allow for adjustment of the power level of the functional units.

5. The integrated circuit of claim 1 where the logic unit indicates which, if any, of the functional units required for execution of an instruction are not at the one power level.

6. The integrated circuit of claim 5 wherein the logic unit includes means to maintain a given functional unit in an optimum power level for a selected time in the absence of additional demand for that functional unit.

7. The integrated circuit of claim 5 wherein the control table includes a timer function to time out a selected time after optimum power level for a given functional unit is initiated.

8. The integrated circuit of claim 7 wherein the timer function is initiated when an optimum power level is required for a given functional unit.

9. The integrated circuit of claim 1 which further includes,
    a monitor unit coupled to the status table for passing power status data to the status table.

10. The integrated circuit of claim 6 wherein the selected time is fixed.

11. The integrated circuit of claim 6 wherein the selected time is programmable.

12. A method of operating an integrated circuit which comprising plural functional units each subject plural power levels and dedicated to different functions, only one of the power levels maximizing performance of the functional unit, a central processor coupled to the functional units and operating at a current processor speed, the method comprising:
    a) identifying an instruction and identifying required ones of the functional units for executing that instruction;
    b) maintaining power level status of the functional units,
    c) determining, based on steps a) and b) whether all the required ones of the functional units have sufficient power levels to execute the instruction at the current processor speed; and
    d) allowing the instruction to be executed at the current processor speed if the power level data indicates that the required functional units have sufficient power.

13. The method of claim 12, which further
    e) reduces the execution speed below the current processor speed if the power level data indicates that not all the required ones of the functional units have sufficient power.

14. The method of claim 12, which further
    selectively adjusts the power levels of the functional units which are required for execution of the instruction which are not presently supplied with sufficient power.

15. The method of claim 14, which further includes stalling execution of an instruction to allow for adjustment of the power level of at least one functional unit.

16. The method of claim 12 which further includes timing a selected time during which a high power level for a given functional unit is required.

17. The method of claim 16 wherein the timing is initiated each time a high power level is required for a given functional unit.

18. The method of claim 16 wherein the period of the timing is fixed.

19. The method of claim 16 wherein the period of the timing is programmable.

* * * * *